United States Patent
Cesareo et al.

(10) Patent No.: US 12,029,273 B2
(45) Date of Patent: Jul. 9, 2024

(54) SHOE SOLE COMPRISING GRAPHENE

(71) Applicant: DIRECTA PLUS S.P.A., Lomazzo (IT)

(72) Inventors: Giulio Giuseppe Cesareo, Como (IT); Massimiliano Bianchi, Carate Brianza (IT); Antonino Di Pasquale, Basiglio (IT)

(73) Assignee: Directa Plus S.p.A. (IT)

( * ) Notice: Subject to any disclaimer, the term of this patent is extended or adjusted under 35 U.S.C. 154(b) by 813 days.

(21) Appl. No.: 17/258,502

(22) PCT Filed: Jun. 20, 2019

(86) PCT No.: PCT/EP2019/066341
§ 371 (c)(1),
(2) Date: Jan. 7, 2021

(87) PCT Pub. No.: WO2020/011511
PCT Pub. Date: Jan. 16, 2020

(65) Prior Publication Data
US 2021/0289883 A1 Sep. 23, 2021

(30) Foreign Application Priority Data

Jul. 10, 2018 (IT) .................. 102018000007084

(51) Int. Cl.
*A43B 13/04* (2006.01)
*A43B 13/02* (2022.01)
(Continued)

(52) U.S. Cl.
CPC ............ *A43B 13/04* (2013.01); *A43B 13/026* (2013.01); *B29C 35/02* (2013.01); *C08K 3/04* (2013.01);
(Continued)

(58) Field of Classification Search
CPC ...... A43B 13/04; A43B 13/026; C08K 3/042; C08K 3/04; B29C 35/02; C08L 9/00
See application file for complete search history.

(56) References Cited

FOREIGN PATENT DOCUMENTS

| CN | 104672514 A | 6/2015 | |
|---|---|---|---|
| WO | WO-2016045960 A1 * | 3/2016 | ............... C08J 3/16 |
| WO | 2017029072 A1 | 2/2017 | |

OTHER PUBLICATIONS

English Machine Translation of CN104672514 A Wear-resisting anti-slip mountaineering sole material and preparation method thereof obtained on Nov. 20, 2023 from https://worldwide.espacenet.com/publicationDetails/biblio?CC=CN&NR=104672514A&KC=A&FT=D&ND=3&date=20150603&DB=EPODOC&locale=en_EP (Year: 2015).*

(Continued)

*Primary Examiner* — Ling Siu Choi
*Assistant Examiner* — Olga Lucia Donahue
(74) *Attorney, Agent, or Firm* — Patterson Intellectual Property Law, P.C.

(57) ABSTRACT

A shoe sole comprising an elastomeric composition comprising: (D) 100 phr of a mixture of rubbers comprising: i. from 40 to 70% by weight of an isoprene polymer; ii. from 20 to 50% by weight of polybutadiene; iii. from 10 to 40% by weight of an SBR having a glass transition temperature (Tg) from −60 to −40° C.; (E) from 50 to 100 phr of amorphous carbon black having a surface area greater than 85 $m^2/g$ measured with the ASTM D6556 method, and a dibutyl phthalate absorption index (DBPA) greater than 90 measured with the ASTM D2414 method; (F) from 1 to 30 phr of graphene nano-platelets, wherein at least 90% of said graphene nano-platelets has a side dimension (x, y) from 50

(Continued)

Payne effect (Index)

Deformation (%)

Figure 1:
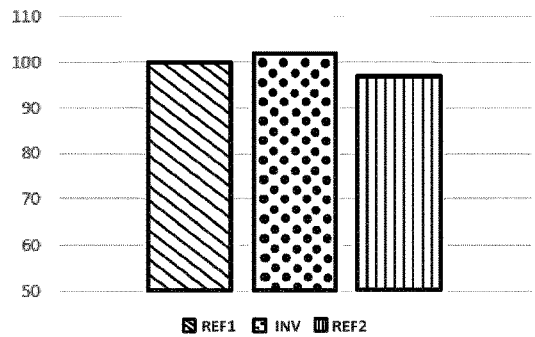
Figure 1:
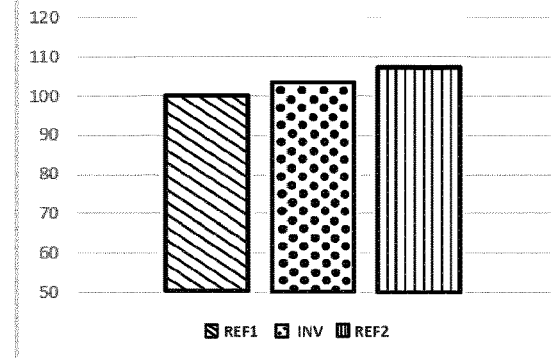

to 50000 nm and a thickness (z) of 0.34 to 50 nm, and wherein said graphene nano-platelets have a C/O ratio ≥100:1.

20 Claims, 4 Drawing Sheets

(51) Int. Cl.
B29C 35/02 (2006.01)
C08K 3/04 (2006.01)
C08L 9/00 (2006.01)
B29K 19/00 (2006.01)
B29K 105/00 (2006.01)
B29K 105/16 (2006.01)
B29K 507/04 (2006.01)
B29L 31/50 (2006.01)
B82Y 40/00 (2011.01)

(52) U.S. Cl.
CPC ............... *C08K 3/042* (2017.05); *C08L 9/00* (2013.01); *B29K 2019/00* (2013.01); *B29K 2105/0005* (2013.01); *B29K 2105/162* (2013.01); *B29K 2507/04* (2013.01); *B29L 2031/504* (2013.01); *B82Y 40/00* (2013.01); *C08K 2201/006* (2013.01); *C08K 2201/011* (2013.01)

(56) References Cited

OTHER PUBLICATIONS

Bera et al. (2018, Structural/Load-Bearing Characteristics of Polymer-Carbon Composites. 10.1007/978-981-13-2688-2_13, p. 470) https://www.researchgate.net/publication/327100387_StructuralLoad-Bearing_Characteristics_of_Polymer-Carbon_Composites ( Year: 2018).*

Yan N et al.: "The role of reduced graphene oxide on chemical, mechanical and barrier properties of natural rubber composites", Composites Science and Technology, Elsevier, Amsterdam, NL, vol. 102, No. 1, Oct. 6, 2014 (Oct. 6, 2014), pp. 74-81, XP002855435, ISSN: 0266-3538, DOI: 10.1016/J. COMPSCITECH.2014.07.021 [retrieved on Jul. 27, 2014].

International Searching Authority: International Search Report for corresponding PCT/EP2019/066341, dated Jul. 30, 2019, 6 pages.

* cited by examiner

SHOE SOLE COMPRISING GRAPHENE

The present invention refers to a shoe sole comprising graphene.

BACKGROUND

The sole is the shoe component that ensures protection of the foot and grip on the ground. It must combine the characteristics of grip on the ground, when both dry and wet, with characteristics of resistance to wear, which are particularly important in the case of sports and/or technical shoes.

If the sole is formed of several layers, it is essential that the functions above are performed at least by the outermost layer, which is the one in direct contact with the ground. It is actually clear that grip and resistance to wear are functions performed by the lower, or outer, part of the sole, which is in direct contact with the ground.

The properties of grip on the ground, in particular on wet ground, and resistance to abrasion, and more generally to wear are not easy to reconcile. In fact, gripping requires a basically soft compound, whereas resistance to wear requires a basically hard compound.

Gripping is facilitated by a soft compound as it adheres better to the ground, for example by penetrating into the surface of the asphalt.

Wear on the sole is a complex phenomenon, determined by various factors, comprising both instantaneous events such as surface cutting of the sole, and events that develop over a long period of time, such as the removal of material due to friction or progressive scraping of the lower surface of the sole.

The optimal balance between gripping of the ground and resistance to wear is defined by a combination of physical-mechanical properties that can be determined by specific measurements.

The sole of a shoe can be made of various materials, including natural materials like leather, but in the sector of sports and technical shoes, and also in many types of walking shoes, the sole generally consists of a mixture of natural or synthetic resins, typically having an elastomeric character. Soles made of polyurethane or natural or synthetic rubber are widely used.

Soles made of rubber, both natural and synthetic, are obtained with the conventional production methods for producing rubber articles, which entail the preparation of a compound of the various components, including additives and fillers, followed by a vulcanization step with the known vulcanization and crosslinking agents.

However technically advanced they are, the known soles still present deficiencies in terms of balance between the properties of grip on the ground, in particular on wet ground, and resistance to wear.

WO 2017/029072 A1 concerns an elastomeric composition for tyres, comprising a mixture of rubbers, graphene nano-platelets and optionally silica and carbon black. The properties required to a composition for tyres are different from those of a composition for shoes.

US 2016/0021969 A1 concerns a shoe comprising a sole produced with a composition of polymers which comprises elastomers and graphene sheets dispersed in a polymer matrix. The graphene used is prepared with various methods, including the reduction of graphene oxide, and has a surface area from 100 to 2630 m$^2$/g. No information is provided on the dimension of the graphene sheets. The polymer matrix can consist of an extremely wide variety of polymers, comprising both elastomeric polymers and non-elastomeric polymers. The polymer composition is applied on a substrate and then vulcanized. Although the improvement of one or more mechanical properties with respect to soles and/or shoes without graphene is cited, no specific comparison data are provided allowing evaluation of the entity of said improvement.

The improvement of one property, however, is not a satisfactory result if not envisaged in the context of an improvement in the balance between at least the grip on the ground and resistance to wear, it being well known that these two properties are basically conflicting, and that an improvement in one is often to the detriment of the other.

SUMMARY OF THE INVENTION

One object of the present invention is therefore to provide a shoe sole comprising an elastomeric composition comprising graphene, having improved properties, particularly having an improved balance between grip on the ground and resistance to wear.

One aspect of the present invention therefore concerns a shoe sole comprising an elastomeric composition characterized in that it comprises:
(A) 100 phr of a mixture of rubbers comprising:
  i. 40 to 70% by weight of an isoprene polymer;
  ii. 20 to 50% by weight of polybutadiene;
  iii. 10 to 40% by weight of an SBR having a glass transition temperature (Tg) from −60 to −40° C.;
and, on the basis of 100 parts by weight (phr) of elastomeric component (A):
(B) 50 to 100 phr of amorphous carbon black having a surface area greater than 85 m$^2$/g measured with the ASTM D6556 method, and a dibutyl phthalate (DBPA) absorption index greater than 90 measured with the ASTM D2414 method;
(C) 1 to 30 phr of graphene nano-platelets,
wherein at least 90% of said graphene nano-platelets has a side dimension (x, y) from 50 to 50000 nm and a thickness (z) from 0.34 to 50 nm, and wherein in said graphene nano-platelets the C/O ratio is ≥100:1.

The isoprene polymer (A)i is preferably natural rubber.

The shoe sole according to the present invention is obtained by vulcanization of an elastomeric composition as defined above by means of known vulcanization and/or crosslinking agents, optionally with the addition of known additives and process adjuvants, stabilizers, thickeners, anti-foaming agents, process oils, biocides and similar, as is known in the art.

The elastomeric composition is then transformed into a shoe sole by means of the known manufacturing processes, such as compression moulding, injection moulding, compression transfer moulding and injection transfer moulding. The vulcanization/crosslinking is carried out in the mould.

DISCLOSURE OF THE INVENTION

The present invention concerns a shoe sole having an improved balance between the properties of wear and grip, both on dry and wet ground. Said improvement of the properties is obtained with a shoe sole that comprises an elastomeric composition comprising:
(A) 100 phr of a mixture of rubbers comprising:
  i. 40 to 70% by weight of an isoprene polymer;
  ii. 20 to 50% by weight of polybutadiene;
  iii. 10 to 40% by weight of an SBR having a glass transition temperature (Tg) from −60 to −40° C.;

and, on the basis of 100 parts by weight (phr) of elastomeric component (A):
(B) 50 to 100 phr of amorphous carbon black having a surface area greater than 85 m$^2$/g measured with the ASTM D6556 method, and a dibutyl phthalate (DBPA) absorption index greater than 90 ml/100 g measured with the ASTM D2414 method;
(C) 1 to 30 phr of graphene nano-platelets,
wherein at least 90% of said graphene nano-platelets has a side dimension (x, y) from 50 to 50000 nm and a thickness (z) from 0.34 to 50 nm, and wherein in said graphene nano-platelets the C/O ratio is ≥100:1.

Preferably at least 90% of the graphene nano-platelets have a side dimension (x, y) from 100 to 25000 nm, more preferably between 500 and 15000 nm, and preferably a thickness (z) from 0.34 to 20 nm, more preferably from 0.34 to 8 nm.

Preferably the C/O ratio of said graphene nano-platelets is ≥200:1.

The isoprene polymer (A)i is preferably natural rubber.

It has now surprisingly been found that the use of a certain type of graphene in a certain type of elastomeric composition allows the balance between resistance to wear and adhesion to and grip on the ground, even if wet, to be improved, namely it provides a good compromise between the values of these parameters without penalizing either of the two in particular. Graphene is a material consisting of a monoatomic layer of carbon atoms hybridized in the form sp$^2$. They are arranged in regular highly crystalline honeycomb structures with compact hexagonal packing.

From the scientific and patent literature, various methods are known for the preparation of graphene, such as chemical-vapour deposition, epitaxial growth, chemical exfoliation and chemical reduction of the oxidised form graphene oxide (GO).

The Applicant Directa Plus S.p.A. is the holder of patents and patent applications relative to production methods of structures comprising layers of graphene, such as EP 2 038 209 B1, WO 2014/135455 A1, WO 2015/193267 A1 and WO 2015/193268 A1. The latter two patent applications describe production methods of dispersions of high purity graphene, from which it is possible to obtain graphene nano-platelets with the dimension required for the production of the present invention, and with a C/O ratio ≥100:1. This ratio is important as it defines the maximum quantity of oxygen bound to the carbon constituting the graphene. In fact, the best properties of graphene, which derive from its high crystallographic quality, are obtained when the quantity of oxygen is minimum.

A high purity graphene, namely with a C/O ratio ≥100, having the dimensional characteristics defined previously, is produced and sold by Directa Plus S.p.A. under the brand G+®.

The Applicant Directa Plus S.p.A. is the holder of the European patent EP 2 038 209 B1 which describes, among other things, a production method for producing structures comprising layers of graphene obtained by means of intercalation and subsequent expansion/exfoliation of graphite.

The Applicant Directa Plus S.p.A. is also the holder of the international patent applications WO 2015/193267 A1 and WO 2015/193268 A1, which describe production methods of dispersions of high purity graphene, from which it is possible to obtain graphene nano-platelets with a C/O ratio ≥100:1, and even higher. This ratio is important as it defines the maximum quantity of oxygen bound to the carbon constituting the graphene. In fact it is known that the best properties of graphene, which derive from its high crystallographic quality, are obtained when the quantity of oxygen is minimum.

A high purity graphene, namely with a C/O ratio ≥100:1, an absence or minimal presence of lattice defects—verifiable by means of Raman spectroscopy—a minimal or nil presence of extraneous substances, including surfactants or functionalizing agents or graphene coupling agents, constitutes a fundamental component for improving the properties of an elastomeric composition intended for the manufacture of shoe soles.

The C/O ratio in the graphene used in the elastomeric composition of the invention is determined by means of elemental analysis performed by elemental analyser (CHNS O), which provides the percentage by weight of the various elements. Calculating the ratio between the percentage of carbon and the percentage of oxygen, the C/O ratio is obtained. The lattice defects of the nano-platelets can be evaluated by Raman spectroscopy, analysing intensity and form of the Peak D positioned at 1350 cm$^{-1}$.

According to embodiments described in the above-mentioned patent documents of the Applicant Directa Plus S.p.A., the process for the production of high purity graphene is performed by continuously feeding graphite flakes to the expansion phase at high temperature, continuously discharging the expanded graphite thus obtained into a liquid medium and continuously subjecting the expanded graphite dispersed in the liquid medium to exfoliation and dimensional reduction treatment performed by ultrasonication and/or homogenization at high pressure.

This process for the production of high purity graphene comprises several steps.

The first step of the process consists in the preparation of expanded and/or exfoliated graphite from intercalated graphite.

The intercalated graphite can be prepared with methods known to a person skilled in the art or purchased on the market. The step of expansion of the intercalated graphite is carried out by subjecting flakes of intercalated graphite (Graphite Intercalation Compounds, GICs) having a side dimension ≤500 μm to a temperature between 1300 and 12000° C. for less than 2 seconds. Said treatment is performed as described in the patent EP 2038209 B1, namely by generating heat in the GICs preferably by means of an electric arc, a microwave oven or high frequency induction oven or plasma oven. The latter treatment is particularly preferred due to the possibility of reaching the desired temperature associated with a high turbulence.

The second step of the process comprises collection and dispersion in an aqueous medium of the expanded graphite obtained in the first step, immediately after its formation.

Preferably the expanded graphite is made to fall by gravity into a receptacle containing an aqueous medium in the absence of surfactants or in the presence of a surfactant in a quantity lower than 1% by weight with respect to the weight of said graphite.

The introduction of the expanded graphite just formed into an aqueous medium allows optimal dispersion thereof to be obtained without the need to use a surfactant, contrary to the teachings of the prior art.

Obtaining an optimal aqueous dispersion of expanded graphite without the aid of a surfactant represents an important advantage, in terms of both the lower cost due to the saving in surfactant, and the improved properties of the end product, as will be described in further detail below. A small quantity of surfactant, however, lower than 1% by weight, can be used without excessively compromising the quality of the end product.

If the expanded graphite is dispersed in the presence of a surfactant, the surfactant is preferably an anionic surfactant, more preferably an anionic surfactant in which the anion constituting the hydrophilic polar group is selected from sulphonate, sulphate and carboxylate, and the hydrophobic non-polar part is selected from structures comprising aromatic rings such as benzene, naphthalene, pyrene or cyclic aliphatic structures such as the derivatives of cholic acid. A preferred surfactant is sodium benzenesulphonate.

The dispersion is obtained by means of gentle agitation.

The expanded graphite is dispersed in water at a concentration from 0.5% to 5% by weight, preferably 1% to 4% by weight, more preferably 2% to 3% by weight.

The third step of the process has the object of obtaining exfoliation of the expanded graphite and its dimensional reduction until obtaining high purity graphene nano-platelets, at least 90% of which have a side dimension (x, y) from 50 to 50000 nm and a thickness (z) from 0.34 to 50 nm, the side dimension being greater than the thickness (x, y>z).

This exfoliation and dimensional reduction is obtained by subjecting the dispersion of graphite in water, in which there is no surfactant or a quantity of surfactant lower than 1% by weight, to an ultrasound treatment or a homogenization treatment at high pressure in which collisions occur between the expanded graphite particles.

The ultrasound treatment is performed at an energy level between 10 and 200 Wh per gram of expanded graphite obtained in the previous step.

Preferably the ultrasound treatment of the aqueous dispersion of expanded graphite is performed at an energy level between 10 and 100 Wh per gram. The ultrasound treatment is performed using equipment such as commercial ultrasonicators for the treatment of liquids, where the acoustic energy is transmitted to the system by cavitation (formation and implosion of bubbles) by means of sonotrode immersed in the liquid, with wave frequency around 24 kHz, and with power as defined above.

The combination of the expansion treatment of the intercalated graphite at high temperature and the subsequent ultrasonication treatment in an aqueous medium allows both exfoliation and dimensional reduction of the graphite, obtaining graphene nano-platelets directly dispersed in water in a relatively short time.

The high pressure homogenization treatment is performed with a homogenizer in which the dispersion of expanded graphite is pumped to a pressure higher than 35 MPa through one or more micro-channels or necks. Here the particles in dispersion are subjected to very high shearing stress, resulting from the sudden drop in pressure, and collision between one another and with the surfaces of the micro-channels or necks.

By the term "neck" we mean a reduction of the cross section of the duct through which the dispersion is forced to flow, and by the term "micro-channel" we mean a neck that extends in the direction of the particle dispersion flow.

Said treatment allows a substantial dimensional reduction of the expanded graphite to be obtained, down to the values according to the axes x, y and z mentioned previously. Said necks can be either of static type, for example flow channels having a maximum dimension of 500 µm, or of dynamic type, for example valves with adjustable section so as to define a neck having a maximum dimension of 500 µm.

High pressure homogenization equipment using static type necks is marketed by Microfluidics International Corporation (Newton, MA, U.S.A.) under the brand Microfluidizer®. In this equipment the dispersion of expanded graphite is pumped to a pressure higher than 35 MPa through a plurality of flow channels having a maximum dimension of 500 µm, in which the particles of expanded graphite are caused to collide. Preferably the maximum pressure is 500 MPa. The structure and operation of this equipment are described, inter alia, also in the U.S. Pat. No. 8,367,004 B2.

High-pressure homogenization equipment using necks of dynamic type are marketed, inter alia, by GEA NIRO-Soavi (Parma, Italy). The structure and operation of this equipment are described, inter alia, also in the U.S. Pat. No. 4,773,833.

According to the entity of the dimensional reduction desired, it is possible to treat the aqueous dispersion of expanded graphite several times in the homogenizer. This can be performed in continuous mode, with various passages through the homogenizer.

Preferably the high-pressure homogenization treatment is carried out in a homogenizer in which the dispersion of expanded graphite is pumped to a pressure higher than 100 MPa through one or more micro-channels or necks.

As mentioned previously, the final dispersion of the graphene nano-platelets obtained after the exfoliation and dimensional reduction performed by means of one or more of the methods defined above can be concentrated or dried, according to the desired final form of the graphene.

The dispersion concentration can be carried out using techniques known to a person skilled in the art, for example removal of the water by evaporation, filtering or centrifugation. The absence—or minimum presence (lower than 1%)—of the surfactant avoids the problem of possible polymerization and allows operation at higher temperatures, in addition to guaranteeing feasibility of the liquid-solid separation.

By means of the above techniques, it is possible to increase the concentration of the dispersion up to 30% by weight. The product obtained in a concentration range from 6 to 30% weight presents a high viscosity and the consistency of a paste, and can be advantageously used as a masterbatch for water-based formulations.

The advantages deriving from the use of a concentrated dispersion in the range 6-30% by weight are: 1) freedom of formulation, namely the possibility of diluting the product up to the desired concentration and choosing the best surfactant for the specific application; 2) high dispersibility due to the presence of the residual water which, interposed between the graphene nano-platelets, weakens the Van der Waals type bonds established between the same; 3) possibility of using the product directly by spreading on the desired substrate; 4) confinement of the graphene nano-platelets in a matrix, with consequent ease of handling and transport.

A particularly advantageous dispersion concentration method is filtering with removal of the water until obtaining above the filter a dispersion having a concentration in the desired range. The filtering system is adjusted by intervening on the treatment time and on the filtering pressure. The filters are defined on the basis of the filtering surface. A suitable filtering system is the one marketed under the brand Funda® by Mavag AG.

The purpose of drying the dispersion is to obtain a dry powder that can be easily re-dispersed in different matrixes, both solvents and polymers, where the liquid is not desirable or manageable at process level, or where the water is not utilizable in terms of chemical compatibility.

The dispersion can be brought to a dry state by means of known techniques, for example by means of freeze-drying, evaporation in a rotary evaporator, or spray drying. In all cases the graphene nano-platelets produced in the absence of surfactant show a high degree of dispersibility. Furthermore, on the one hand the low oxygen content and the absence of lattice defects guarantee good chemical-physical properties, and on the other guarantee non-reagglomeration of the nano-platelets in a stable manner, due to a covalent chemical interaction. The high aspect ratio (high side dimension and low thickness) guarantees optimal performance in terms of both electrical and thermal conductivity and barrier properties.

A very important advantage of the process described consists in the possibility of operating without surfactant. The graphene nano-platelets thus obtained have a very high purity, due both to the high C/O ratio and to the absence of extraneous substances which end up by being contaminants, for example surfactants. In fact it has been ascertained that the absence of surfactants allows graphene to be obtained having an electric conductivity substantially superior to that of the graphene obtained with the processes that use surfactants. This improves the performance of the graphene in multiple applications.

The high purity graphene nano-platelets, at least 90% of which have a side dimension (x, y) from 50 to 50000 nm and a thickness (z) from 0.34 to 50 nm, with C:O ratio ≥100:1, have a high electric conductivity. The electric conductivity is determined on a film obtained by deposition of an aqueous dispersion of said nano-platelets on a glass substrate forming a 1 cm×1 cm film and dried by means of heating plate at 100° C. for 15 minutes, and is measured in Van der Pauw configuration. Said film has an electric conductivity ≥1500 S/m, preferably ≥2000 S/m.

It has also been ascertained that when a dispersion of graphene nano-platelets forms in the presence of surfactant, the latter is deposited on the surface of said nano-platelets and tends to promote their agglomeration.

In the present description the graphene nano-platelets refer dimensionally to a system of Cartesian axes x, y, z, it being understood that the particles are substantially flat platelets but can also have an irregular shape. In all cases the side dimension and the thickness provided with reference to the directions x, y and z should be understood as the maximum dimensions in each of the above-mentioned directions.

The side dimensions (x, y) of the graphene nano-platelets are determined by direct measurement under the scanning electron microscope (SEM), after diluting the final dispersion in a ratio 1:1000 in deionized water and having dripped it dropwise onto a substrate of silicon oxide arranged on a plate heated to 100° C. with statistical measurement by means of laser diffractometry (see Malvern examples).

Alternatively, with the nano-platelets available in the dry state, the SEM analysis is performed directly on the powder deposited on carbon tape. In both cases, the measurement is performed on at least 100 nano-platelets. The thickness (z) of the graphene nano-platelets is determined using an atomic force microscope (AFM), which is essentially a profilometer with subnanometric resolution, widely used for the characterization (mainly morphological) of surfaces and nanomaterials. This type of analysis is commonly used (both in the academic world and in industrial R&D) for evaluating the thickness of graphene flakes, produced in any way, and therefore identifying the number of layers composing the flake (single layer=0.34 nm).

The final dispersion of nano-platelets is diluted in a ratio 1:1000 in isopropanol, then 20 ml are collected and subjected to sonication in an ultrasound bath (Elmasonic S40) for 5 minutes. The nano-platelets of the final dispersion, deposited as described for the SEM analysis, are scanned directly with an AFM tip, where the measurement provides a topographic image of the graphene flakes and their profile with respect to the substrate, allowing precise measurement of the thickness. The measurement is taken on at least 50 nano-platelets.

Alternatively, with the nano-platelets available in the dry state, the powder is dispersed in isopropanol at a concentration of 2 mg/L. 20 ml are collected and sonicated in an ultrasound bath (Elmasonic S40) for 30 minutes. The nano-platelets are then deposited as described for the SEM analysis and are scanned by AFM. The final dispersion of the graphene nano-platelets obtained after the exfoliation treatment and dimensional reduction performed by means of one or more of the methods b1) and b2) defined above can be advantageously concentrated or dried, according to the desired final form of the graphene, thus obtaining the graphene nano-platelets having the desired dimensions.

The graphene nano-platelets having the above-mentioned dimensional and purity characteristics, and therefore an extremely low oxygen content, as defined by the above-mentioned C:O ratio and not functionalized with other molecules, have proved to be particularly suitable for use as components in elastomeric compositions for shoe soles, where it is possible to achieve the desired properties such as: i) improvement in the dynamic-mechanical properties, in particular in the balance between resistance to wear and adhesion on wet surfaces; ii) improved barrier to gases, with consequent increase in impermeability; iii) increase in thermal conductivity, useful for heat dissipation; iv) increase in electric conductivity, useful for the dissipation of electrostatic charges.

The graphene nano-platelets having the above-mentioned characteristics constitute the component (C) of the elastomeric composition of the sole according to the invention.

Preferably the shoe sole according to the invention comprises 1 to 15 phr of graphene nano-platelets (Component C).

The component (A) of the elastomeric composition of the sole according to the invention is a mixture of rubbers comprising an isoprene polymer (NR), a 1,3-butadiene (PB) polymer, a styrene-butadiene (SBR) copolymer having a Tg from −60 to −40° C., in the quantities previously indicated. The Tg was measured with the method ASTM D7426. In the present description the term "rubber" and the term "elastomer" are used with the same meaning and are therefore interchangeable, unless specified otherwise.

In the present description the term "phr" designates the parts by weight of a component with respect to 100 parts by weight of elastomer (A).

The isoprene polymer can consist of natural rubber (NR), with configuration 1,4 cis, but obviously it can also be obtained by synthesis, polymerizing the isoprene monomer only in the stereospecific form in order to obtain a configuration of 1,4-cis only. It is also possible to polymerize the isoprene with 1,3-butadiene, obtaining an isoprene-butadiene copolymer, or polymerize isoprene with styrene, obtaining an isoprene-styrene copolymer.

The polymer of 1,3-butadiene is polybutadiene (PB), which contains the three typical configurations: 1,2-vinyl, 1,4-cis, 1,4-trans in variable ratios. The polybutadiene with very high content of 1,4-cis units is particularly preferred.

The styrene-butadiene (SBR) polymer having a Tg from −60 to −40° C. is preferably obtained by means of copolymerization of styrene and butadiene in solution or emulsion. The copolymer obtained with the process in solution is designated by the initials S-SBR and is particularly useful also for the production of shoe soles. The process in solution for the production of S-SBR elastomers allows targeted ratios to be obtained between the two monomers (butadiene and styrene) and in particular it is possible to obtain in the butadiene phase a variable content of the 1,2-vinyl configuration.

The copolymer SBR preferably has a styrene unit content between 5 and 40% by weight, preferably between 10 and 30% by weight. Styrene unit content was measured with the method ASTM D5775. As is known, the butadiene phase can have a 1,4-cis, 1,4-trans and 1,2 vinyl configuration. The content of the 1,2 vinyl group contributes to raising the Tg. In order to maintain the Tg in the desired range it is preferable for the 1,2 vinyl configuration to be absent or for its content to be reduced. A content of 1,2 vinyl units from 0 to 30% by weight is preferred. By way of example, an SBR polymer in emulsion comprises a styrene unit content of 23.5% by weight and therefore in the butadiene phase contains 50% by weight of 1,4-trans units, 40% by weight of 1,4-cis units and 10% by weight of 1,2 vinyl units, corresponding to Tg=−50° C.

The SBR copolymer can also comprise other monomers, such as isoprene, and therefore be a styrene-butadiene-isoprene terpolymer.

The above-mentioned polymers are available commercially and in any case their preparation processes are well known to persons skilled in the art.

Preferably the shoe sole according to the invention comprises an elastomeric composition comprising, on the basis of 100 parts by weight (phr) of elastomeric component:
 i. 45 to 55% by weight of an isoprene polymer;
 ii. 25 to 35% by weight of polybutadiene;
 iii. 15 to 25% by weight of SBR having a glass transition temperature (Tg) from −60 to −40° C.

Preferably, the glass transition temperature (Tg) of the SBR varies from −55 to −45° C.

The component (B) of the elastomeric composition according to the invention consists of 50 to 100 phr of amorphous carbon black having a surface area greater than 85 $m^2/g$ measured with the ASTM D6556 method, and a dibutyl phthalate (DBPA) absorption index greater than 90 measured with the ASTM D2414 method.

Preferably the carbon black is present in a quantity from 50 to 80 phr with respect to the Component A.

The carbon black consists of aggregates of very fine particles having an amorphous almost graphitic structure. The types of carbon differ mainly due to the dimensions of the particles and their structure. The classification is carried out with alphanumerical codes that take account of the surface area and structural characteristics.

The surface area is measured preferably with the nitrogen method, according to ASTM D6556. The N900 code identifies a product with a low surface area, from 7 to 11 $m^2/g$. The codes from N100 to N700 identify products with higher surface area, from 27 to 145 $m^2/g$.

According to the present invention the carbon black has a surface area preferably greater than 90 $m^2/g$, more preferably from 95 $m^2/g$ to 130 $m^2/g$.

The structural and morphological characteristics of the carbon black are measured with the dibutyl phthalate (DBPA) absorption index, a method that determines the quantity of DBP that can be absorbed by 100 g of carbon black.

According to the present invention, the carbon black has a DBPA index preferably greater than 95 ml/100 g, measured with the ASTM D2414 method, preferably from 95 ml/100 g to 120 ml/100 g.

The elastomeric composition according to the invention can comprise other components in addition to the components (A), (B) and (C), such as additives, process agents, antioxidants, plasticizers, and comprises the substances required for the vulcanization, such as crosslinkers and accelerators, as is known to persons skilled in the art.

The specific compound for shoe soles is prepared in a first phase by placing the composition (A)+(B)+(C), plus the additives, in a closed mixer, heated between 50 and 100° C., from which a "master" is discharged containing all the components except for the accelerators and crosslinkers. These are added in a second phase, at a temperature between 50 and 80° C. at the discharge, with subsequent continuation of the vulcanization in the final mould.

The shoe sole is obtained by means of vulcanization of the elastomeric composition as defined by known manufacturing processes, such as compression moulding, injection moulding, compression transfer moulding and injection transfer moulding. The vulcanization is completed in the final forming mould of the sole.

The following examples illustrate some embodiments of the invention and are provided by way of non-limiting example.

EXAMPLES

Figure 2:
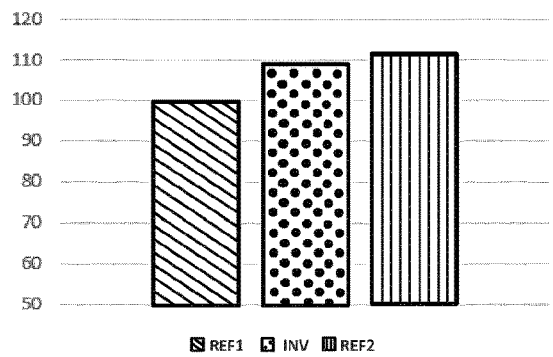
Figure 2:
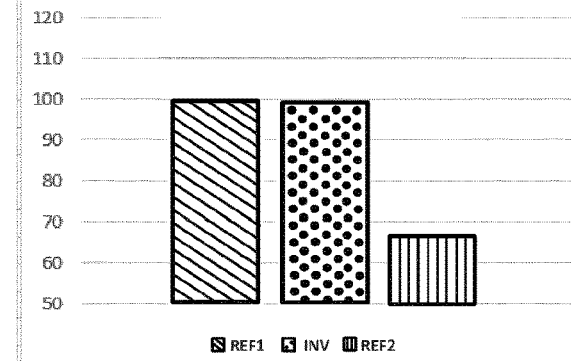
Figure 3:
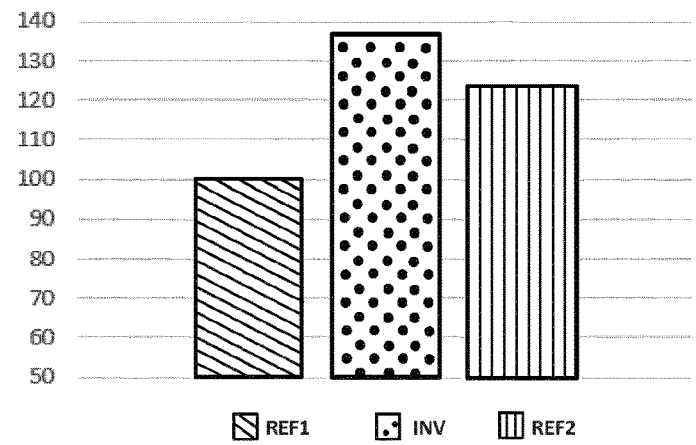
Figure 4:
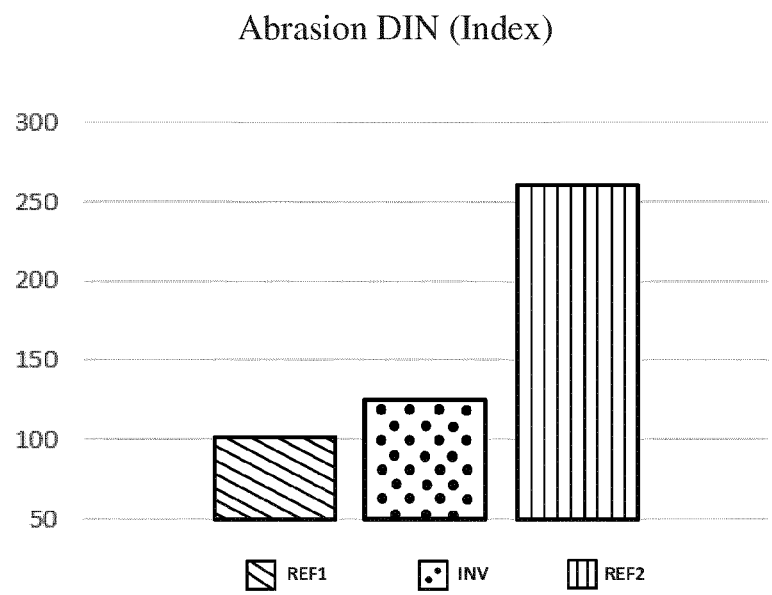
Figure 5:
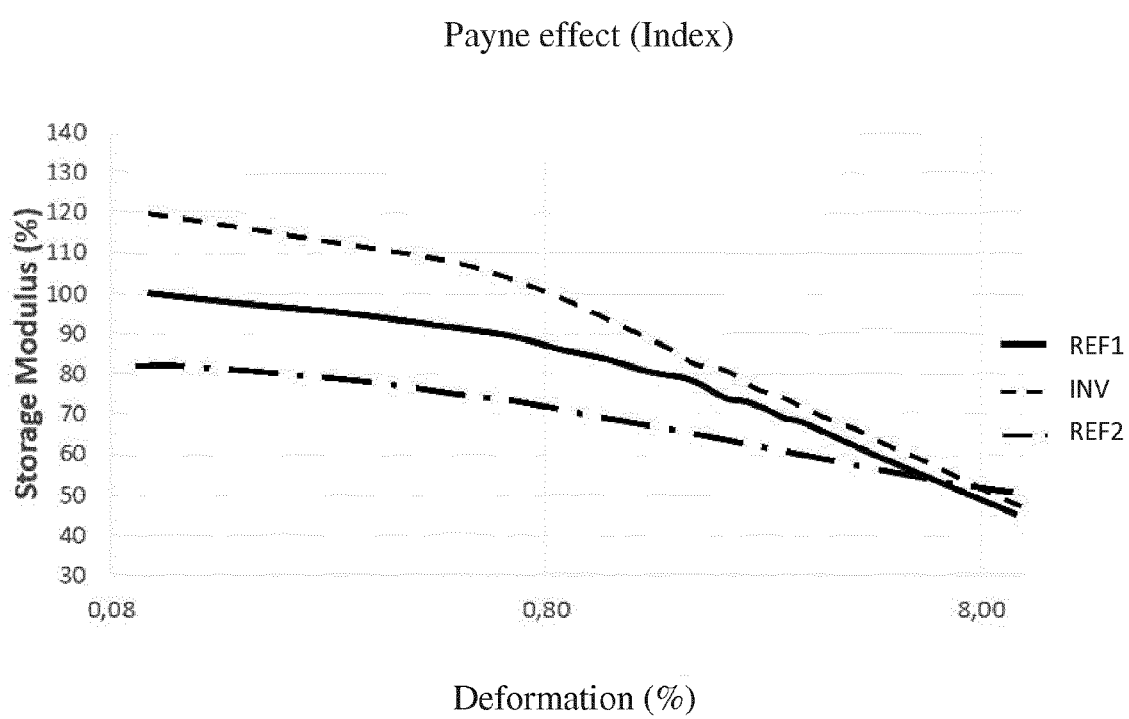
Figure 6:
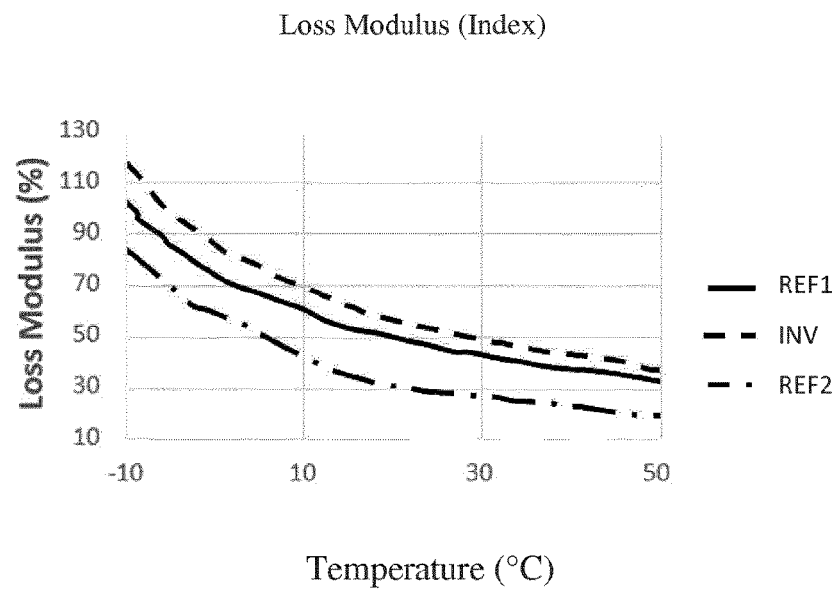
Figure 7:
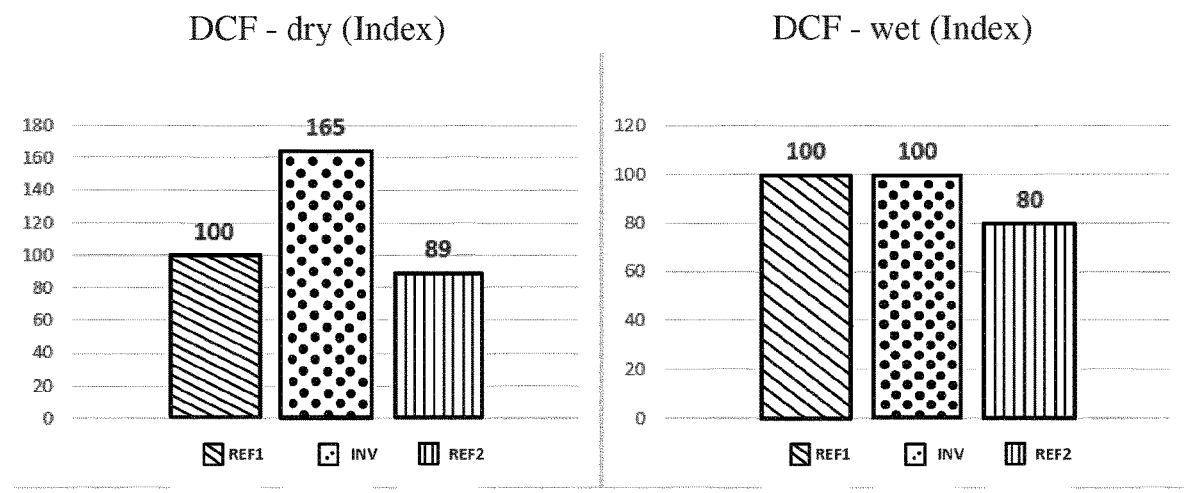
Figure 8:
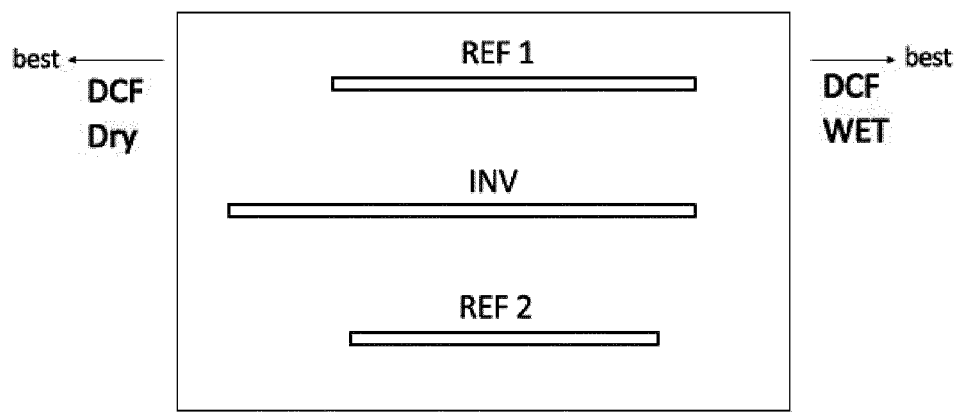

The examples also refer to the attached figures, in which:
FIG. 1 shows hardness tests and rebound resilience of compositions of the examples;
FIG. 2 shows tests relative to the elastic modulus of compositions of the examples;
FIG. 3 shows tests relative to the tear strength of compositions of the examples;
FIG. 4 shows tests relative to the abrasion resistance of compositions of the examples;
FIG. 5 shows tests relative to the Payne effect of compositions of the examples;
FIG. 6 shows tests relative to the loss modulus of compositions of the examples;
FIGS. 7 and 8 show tests relative to the dynamic friction coefficient of compositions of the examples.

PREPARATION OF THE ELASTOMERIC COMPOSITION

In all the examples an elastomeric composition was prepared, also called "compound", in a 2.3 litre closed laboratory mixer with a two-phase process and rotor speed between 30 and 40 r.p.m.

The first phase, lasting overall between 3 and 5 minutes, consists in preparation of the master at a temperature between 50 and 100° C., which comprises all the components except for the accelerators and crosslinkers.

The second phase consists in addition, again in a closed internal mixer, of the accelerators and crosslinkers for 90 seconds, at a temperature between 50° C. and 80° C. at the discharge, with subsequent continuation in a cylinder mixer and completion of the vulcanization in the final forming mould, in a compression press.

Two reference compositions were prepared, one without addition of the graphene nano-platelets (designated as Ref 1), and another according to WO 2017/029072 A1 of the same Applicant, relative to an elastomeric composition for tyres, also comprising graphene nano-platelets (designated as Ref 2).

A composition according to the invention was also prepared, designated as Inv.

The compositions obtained at the end of the preparation process in two phases are illustrated in Table 1, where the ingredients of the component (A) are expressed as % by weight, while the other components are expressed in parts by weight per 100 parts (phr) of component (A).

TABLE 1

| | COMPOSITION | Ref 1 | Inv | Ref 2 |
|---|---|---|---|---|
| (A) | Natural rubber (% weight) | 50 | 50 | 40 |
| | Polybutadiene (% weight) | 30 | 30 | 30 |
| | SBR (Tg −50° C.) (% weight) | 20 | 20 | 0 |
| | SBR (Tg −25° C.) (% weight) | 0 | 0 | 30 |
| (B) | Carbon black N220 (phr) | 55 | 55 | 0 |
| | Carbon black N330 (phr) | 0 | 0 | 30 |
| (C) | Graphene nano-platelets (phr) | 0 | 3 | 6 |
| | Silica (phr) | 0 | 0 | 15 |
| | Zinc oxide (phr) | 4 | 4 | 5 |
| | Stearic acid (phr) | 2 | 2 | 1 |
| | Process oil (phr) | 8 | 8 | 5 |
| | Anti-ageing agent (phr) | 5 | 5 | 11 |
| | Process adjuvants (phr) | 5 | 5 | 6 |
| | Accelerators and crosslinkers (phr) | 3.2 | 3.2 | 5 |

The SBR in solution (SSBR) having Tg=−51° C. has a styrene unit content of 26% by weight and in the butadiene phase has a 1,2-vinyl unit content of 24% by weight.

The natural rubber is SMR (Standard Malaysian Rubber) type.

The polybutadiene is Europrene Neocis type.

The carbon black N220 has a surface area of 104 m$^2$/g and a DBPA index of 114 ml/100 g.

The carbon black N330 has a surface area of 76 m$^2$/g and a DBPA index of 102 ml/100 g.

The graphene of the Inv composition has side dimensions (x-y), expressed as D90, between 10000 and 15000 nm and thickness (z) between 0.34 and 20 nm, and is produced by Directa Plus S.p.A. and marketed under the brand G+. The side dimensions were measured using a Malvern 3000 laser granulometer according to the method developed according to the ISO 9001:2015 standard.

The compositions Ref 1, Ref 2 and Inv were characterized to measure the properties of interest for application purposes.

The characterizations entail tests of different type such as tests on the non-vulcanized material (compound) and determination of the vulcanization kinetics via the use of an instrument called "Vulcanograph" by Alpha Technologies, model MDR2000.

Once the vulcanization kinetics were determined, test pieces were produced suitable for the intended tests. All the tests were performed in the same certified laboratory except for the dynamic tests and tests on the dynamic friction coefficient, which were performed at two specialist laboratories equipped with special instruments.

The vulcanization kinetics were determined by the ISO 3417 method.

The hardness was measured by the ISO 868 method.

The stress strain curves were determined with the DIN 53504 method.

The trouser tear was determined by means of the ISO 34-1 Trouser method.

The abrasion was measured with the DIN D53516 method.

The rebound resilience was determined with the ISO 4662 (Zerbini pendulum) method.

As regards the characteristics of the vulcanized compositions, the data relative to the hardness tests (in Shore A) should be considered aligned with one another (FIG. 1) while the rebound resilience tests (by means of Zerbini pendulum), of the composition Inv and the composition Ref 2 show an improvement with respect to the composition Ref 1.

As regards the trend of the moduli, 100% and 300%, in a stress-strain curve (FIG. 2), the histogram shows that the values of the compositions containing G+(Inv and Ref 2) are comparable but superior with respect to the modulus of the reference composition Ref 1. Contrarily, analysing the histogram relative to the 300% modulus, it is observed that the modulus of the reference composition Ref 1 and of the composition according to the invention Inv are much higher than the composition Ref 2. Without being bound to any particular theory, we believe that this is due to the specific degree of carbon black of the composition Inv, having a higher surface area and DBPA index than the carbon black of the composition Ref 2, and to its higher quantity.

As regards the tear strength properties (FIG. 3), it is observed that the compositions containing G+ show a trend superior to the reference Ref 1. It is, however, important to note that the composition Inv shows a tear strength superior to the composition Ref 2, which we believe is due to the presence of the specific carbon black grade, and to the presence of the styrene-butadiene (SBR) copolymer with Tg equal to −50° C., having a microstructure with very low 1,2 vinyl unit content.

As regards resistance to abrasion, it can be seen from the histograms of FIG. 4 that the reference composition Ref 2 is greatly inferior to the composition Inv. Comparing the histograms of FIG. 4 it is observed that the reference composition Ref 1 has values lower than the composition Inv. Nevertheless, the abrasion values of the composition Inv are suitable for use in shoe soles since the application specifications require only slightly higher abrasion resistance limit values. Comparing said results with the compound Ref 2, an enormous difference appears evident due once again to the presence of both a polymer grade (SBR) at Tg−50° C. and a specific carbon black grade with higher surface area, better structure and present in greater quantity.

The analysis of the dynamic-mechanical properties focused on evaluation of the properties correlated with wear on the sole with the dynamic tests according to Payne, called "Payne Effect". The Payne effect analyses the trend of the dynamic modulus (storage modulus E' or G' expressed in MPa) according to the deformation expressed in percentage (%), having fixed the frequency and temperature of the test. High elastic modulus values at low deformations guarantee better wear behaviour. Dynamic-mechanical analyses (DMA) were carried out by means of traction tests with slight constant preload with the instrument TA Instrument Q800, in the following operating conditions: constant temperature of 60° C., frequency 1 Hz, dynamic deformation 0 to 10%.

FIG. 5 highlights an interesting phenomenon due to the particular interaction between the graphene nano-platelets G+ and the elastomeric matrix. Observing the curves relative to the compounds Ref 1 and Inv, an increase in the elastic modulus (storage modulus) is found in the composition Inv containing the graphene nano-platelets G+. In fact, the values of E' at low deformations are increased by 19% with respect to the reference composition Ref 1 (FIG. 5). This allows greater wear resistance to be obtained. Without prejudice to the fact that the graphene nano-platelets G+ added to a formulation entail an increase in the storage modulus with respect to the same not containing G+, the curve relative to the compound Ref 2 shows values of E' lower than the compounds Ref 1 and Inv due to the type of carbon black used, which has a surface area and DBPA index lower than those of the carbon black used in the other two compounds, and is furthermore present in a lower quantity.

Dynamic-mechanical analyses were also performed at different temperature in a range between −100° C. and +80° C., by means of traction test with slight constant preload with the instrument TA Instrument Q800 at a frequency of 1 Hz. Observing the various spectra in terms of E" (Loss Modulus, FIG. 6), it is observed that for the entire trend of the spectrum, in the thermal operating range (−10 to +50° C.), the composition Inv is always higher than the references Ref 1 and Ref 2, for the reasons previously given. This is due to the interaction effect of the graphene nano-platelets G+ with the polymers Ai, Aii and Aiii, thus determining an increase in the Loss Modulus, and giving rise to an improvement in the viscous properties (improved grip/dynamic friction coefficient).

Dynamic friction coefficient (DFC) tests were subsequently performed in compliance with the UNI-EN-ISO 13287 standard, which prescribes both dry and wet tests.

The results obtained, adimensional values, highlight that the test piece of the composition Inv with respect to Ref 1 shows comparable values in wet conditions, and clearly superior values in dry conditions (FIG. 7 and FIG. 8). The higher the values, the better the dynamic friction behaviour. The composition Ref 2, on the other hand, presents lower dynamic friction values, in both conditions, even though they are considered ideal in the balance for application in the tyre sector.

The tests discussed above confirm the data obtained via the DMA tests and show that the composition Inv allows improvement in the balance of the wear and grip properties on both wet and dry surfaces. It is therefore ideal as a composition for shoe soles.

The invention claimed is:

1. A shoe sole comprising:
an elastomeric composition, said elastomeric composition comprising:
100 phr of a rubber mixture, said rubber mixture comprising:
from 40% to 70% by weight of an isoprene polymer,
from 20% to 50% by weight of polybutadiene, and
from 10% to 40% by weight of a styrene butadiene polymer ("SBR") having a glass transition temperature from −60° C. to −40° C.;
based on 100 phr of said rubber mixture:
from 50 phr to 100 phr of amorphous carbon black, said amorphous carbon black having a surface area greater than 85 m$^2$/g, measured according to standard ASTM D6556, said amorphous carbon black having a dibutyl phthalate absorption (DBPA) index greater than 90 ml/100 g, measured according to standard ASTM D2414; and
from 1 phr to 30 phr of graphene nano-platelets, wherein at least 90% of said graphene nano-platelets have a side dimension from 50 nm to 50,000 nm and a thickness of 0.34 nm to 50 nm, and wherein said graphene nano-platelets have a carbon/oxygen (C/O) ratio greater than or equal to 100:1.

2. The shoe sole of claim 1, wherein said SBR comprises a styrene unit content ranging from 5% to 40% by weight.

3. The shoe sole of claim 1, wherein said SBR comprises a butadiene phase having a 1,2-vinyl unit content ranging from 0% to 30% by weight.

4. The shoe sole of claim 1, wherein said graphene nano-platelets have a C/O ratio greater than or equal to 200:1.

5. The shoe sole of claim 1, wherein the at least 90% of said graphene nano-platelets have a side dimension from 100 nm to 25,000 nm and a thickness of 0.34 nm to 20 nm.

6. The shoe sole of claim 1, wherein said rubber mixture comprises:
from 45% to 55% by weight of said isoprene polymer,
from 25% to 35% by weight of said polybutadiene, and
from 15% to 25% by weight of said SBR having a glass transition temperature from −60° C. to −40° C.

7. The shoe sole of claim 1, wherein said SBR has a glass transition temperature from −55° C. to −45° C.

8. The shoe sole of claim 6, wherein said amorphous carbon black has a surface area ranging from 95 m$^2$/g to 130 m$^2$/g, measured according to the standard ASTM D6556.

9. The shoe sole of claim 1, wherein said amorphous carbon black has a DBPA index ranging from 95 ml/100 g to 120 ml/100 g, measured according to the standard ASTM D2414.

10. The shoe sole of claim 1, wherein said elastomeric composition comprises from 1 phr to 15 phr of said graphene nano-platelets.

11. The shoe sole of claim 1, herein said elastomeric composition comprises from 50 phr to 80 phr of said amorphous carbon black.

12. A shoe sole comprising:
an elastomeric composition, said elastomeric composition comprising:
100 phr of a rubber mixture, said rubber mixture comprising:
from 45% to 55% by weight of an isoprene polymer,
from 25% to 35% by weight of polybutadiene, and
from 15% to 25% by weight of a styrene butadiene polymer ("SBR") having a glass transition temperature from −55° C. to −45° C.;
based on 100 phr of said rubber mixture:
from 50 phr to 80 phr of amorphous carbon black, said amorphous carbon black having a surface area ranging from 95 m$^2$/g to 130 m$^2$/g, measured according to standard ASTM D6556, said amorphous carbon black having a dibutyl phthalate absorption (DBPA) index ranging from 95 ml/100 g to 120 ml/100 g, measured according to standard ASTM D2414; and
from 1 phr to 15 phr of graphene nano-platelets, wherein at least 90% of said graphene nano-platelets have a side dimension from 100 nm to 25,000 nm and a thickness of 0.34 nm to 20 nm, and wherein said graphene nano-platelets have a carbon/oxygen (C/O) ratio greater than or equal to 100:1.

13. The shoe sole of claim 12, wherein said SBR comprises a styrene unit content ranging from 5% to 40% by weight.

14. The shoe sole of claim 12, wherein said SBR comprises a butadiene phase having a 1.2-vinyl unit content ranging from 0% to 30% by weight.

15. The shoe sole of claim 12, wherein said graphene nano-platelets have a C/O ratio greater than or equal to 200:1.

16. The shoe sole of claim 12, wherein the at least 90% of said graphene nano-platelets have a side dimension from 500 nm to 15,000 nm and a thickness of 0.34 nm to 8 nm.

17. A method of fabricating a shoe sole, comprising the steps of:
preparing an elastomeric composition, said elastomeric composition comprising:
100 phr of a rubber mixture, said rubber mixture comprising:
from 40% to 70% by weight of an isoprene polymer,
from 20% to 50% by weight of polybutadiene, and
from 10% to 40% by weight of a styrene butadiene polymer ("SBR") having a glass transition temperature from −60° C. to −40° C.;
based on 100 phr of said rubber mixture:
from 50 phr to 100 phr of amorphous carbon black, said amorphous carbon black having a surface area greater than 85 m²/g, measured according to standard ASTM D6556, said amorphous carbon black having a dibutyl phthalate absorption (DBPA) index greater than 90 ml/100 g, measured according to standard ASTM D2414; and
from 1 phr to 30 phr of graphene nano-platelets, wherein at least 90% of said graphene nano-platelets have a side dimension from 50 nm to 50,000 nm and a thickness of 0.34 nm to 50 nm, and wherein said graphene nano-platelets have a carbon/oxygen (C/O) ratio greater than or equal to 100:1;
heating said elastomeric composition at a temperature between 50° C. and 100° C. for a time between 3 minutes and 5 minutes;
adding accelerators and crosslinkers to said elastomeric composition at a temperature between 50° C. and 80° C. for about 90 seconds; and
vulcanizing said elastomeric composition.

18. The method of fabricating the shoe sole according to claim 16, said elastomeric composition further comprising at least one of additives, process agents, antioxidants, or plasticizers.

19. The method of fabricating the shoe sole according to claim 17, wherein the step of vulcanizing comprises compression molding, injection molding, compression transfer molding, or injection transfer molding.

20. The method of fabricating the shoe sole according to claim 17, wherein said SBR comprises a styrene unit content ranging from 5% to 40% by weight.

* * * * *